United States Patent

Schoch et al.

[11] Patent Number: 5,857,916
[45] Date of Patent: *Jan. 12, 1999

[54] MOTOR VEHICLE DRIVE SHAFT COMPRISING A STRAIGHT SEAM WELDED PIPE OF AN ALUMINUM ALLOY

[75] Inventors: Heinz Schoch, Nienhagen; Klaus-Georg Böttger, Ronnenberg; Thorsten Schulze, Wunstorf; Jürgen Westhof, Ahausen, all of Germany

[73] Assignee: VAW Aluminum AG, Hanover, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 429,655

[22] Filed: Apr. 27, 1995

[30] Foreign Application Priority Data

Apr. 27, 1994 [DE] Germany ............ 44 14 710.4

[51] Int. Cl.⁶ .................................................. F16C 3/00
[52] U.S. Cl. ...................... 464/183; 464/902; 138/156; 138/171; 148/523
[58] Field of Search .................. 464/179, 183, 464/902; 428/36; 138/156, 171; 148/519, 521, 522, 523

[56] References Cited

U.S. PATENT DOCUMENTS

| | | |
|---|---|---|
| 4,082,578 | 4/1978 | Evancho et al. . |
| 4,324,596 | 4/1982 | Wuebker . |
| 4,392,839 | 7/1983 | Aucktor ............................ 464/183 |
| 4,527,978 | 7/1985 | Zackrisson ....................... 464/183 |
| 4,699,243 | 10/1987 | Enoki ............................ 138/156 X |
| 5,320,580 | 6/1994 | Simon .............................. 464/183 |

FOREIGN PATENT DOCUMENTS

| | | |
|---|---|---|
| 3510091 | 9/1986 | Germany . |
| 41 42 325 | 6/1993 | Germany . |

Primary Examiner—Donald P. Walsh
Assistant Examiner—William A. Rivera
Attorney, Agent, or Firm—Burns, Doane, Swecker & Mathis, L.L.P.

[57] ABSTRACT

A drive shaft for motor vehicles in the form of a pipe consisting of aluminum. The drive shaft is a straight seam welded pipe consisting of a strain-hardening aluminum alloy. The pipe is straight seam welded without incorporation of additional materials and the wall thickness of the pipe is greater than 2 mm.

13 Claims, 2 Drawing Sheets

MOTOR VEHICLE DRIVE SHAFT COMPRISING A STRAIGHT SEAM WELDED PIPE OF AN ALUMINUM ALLOY

BACKGROUND OF THE INVENTION

The invention relates to a drive shaft for motor vehicles.

Pipes have been used as drive shafts for motor vehicles and it is known to produce such pipes from steel as well as aluminum materials. Further, in as far as steel pipes are installed, such steel pipes can be straight seam welded pipes.

The requirements for drive shafts are satisfactorily met with straight seam welded steel pipes, especially with regard to dynamic characteristics. However, it is disadvantageous that the steel pipe has a relatively heavy weight compared to pipes made of aluminum. One endeavors, therefore, to utilize aluminum pipes, which are considerably lighter. The weight savings for aluminum pipes is at least approximately 30% in contrast to steel pipes. In view of the tendency in the construction of motor vehicles toward saving weight in dynamically loaded parts, whereby additional component parts, such as bearings, can be more cost-effectively designed and dimensioned, the endeavor is to use aluminum. In addition, a lower vehicle weight makes a lower fuel consumption possible.

The known drive shafts consisting of aluminum are made from extruded pipe rounds. Due to the high precision generally required for drive shafts, the known aluminum pipes must be subjected to drawing for forming drive shafts, which is associated with a considerable expenditure.

As is generally known, the dynamic characteristics stand at the forefront among others for drive shafts, from which the high precision noted becomes an assumption. This precision relates to the maintenance of the outer diameter as well as the constant wall thickness of the aluminum pipe. Due to the high rotary speed of drive shafts, it is necessary to observe very narrow tolerances to guarantee a secure synchronism. In exceptional cases it may be necessary to weld balancing weight pieces at certain points on the pipe for incompletely finished drive shafts made of aluminum pipes in order to guarantee the synchronism striven for, or rather the required dynamic characteristics of the drive shaft in the sense of balancing. Besides that, the manufacture of extruded aluminum pipes with the relatively thin wall thicknesses required for drive shafts is connected with a high finishing technological expenditure.

Consequently, serious disadvantages still stand in the way of using aluminum for drive shafts, and the known extruded aluminum pipes must be classified as very costly and expensive due to the noted precision.

In addition to extruded aluminum pipes, straight seam welded pipes from aluminum alloys are also known. In German Patent Publication No. DE 41 42 325 A1, a method for the manufacture of driving gear supports from aluminum for vehicles, especially passenger cars, is described. The circumstances thus create the starting point that in the cases in which the extruded aluminum pipes to this point are processed into drive gear parts for motor vehicles, numerous shaping steps are required, which include hydraulic forming and internal high pressure shaping methods. As is described in the '325 German Patent Publication, the known extruded aluminum pipes have the inherent disadvantage that a hydraulic shaping is not possible for other prior working steps since the shaping capability of the material is depleted due to the previous working. It is also impossible to process anneal the material before the hydraulic shaping, since the material is either hardened or too soft and thus has lost its consistency.

To find a source material for the manufacture of gear drive supports made from aluminum alloys with this background notwithstanding, with which the necessary shaping steps can be conducted without problems, a method is proposed in the '325 German Patent Publication, in which straight seam welded pipes are made from a strain-hardening or heat treatable aluminum alloy as blanks.

THE INVENTION

The invention provides a drive shaft from aluminum for motor vehicles, which can be manufactured economically and cost-effectively despite the precision required by the dynamic characteristics and the narrow tolerances required for drive shafts. Thus, the invention satisfies a need in the art for an aluminum drive shaft while obviating the disadvantages associated with the previously known extruded and drawn aluminum shafts.

Figure 1:
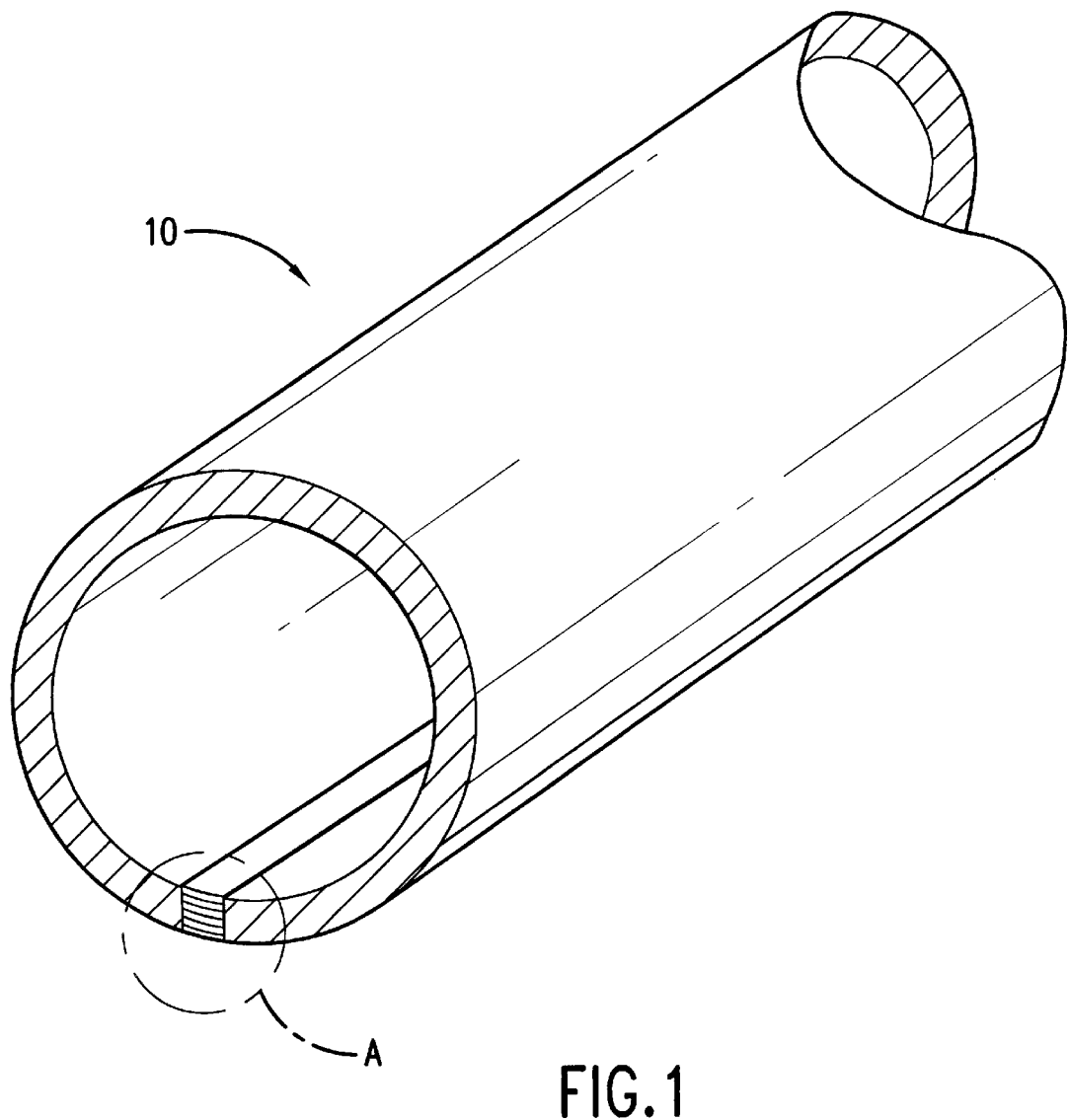
FIG. 1 shows a perspective view of a portion of a motor vehicle drive shaft in accordance with the invention.
Figure 2:
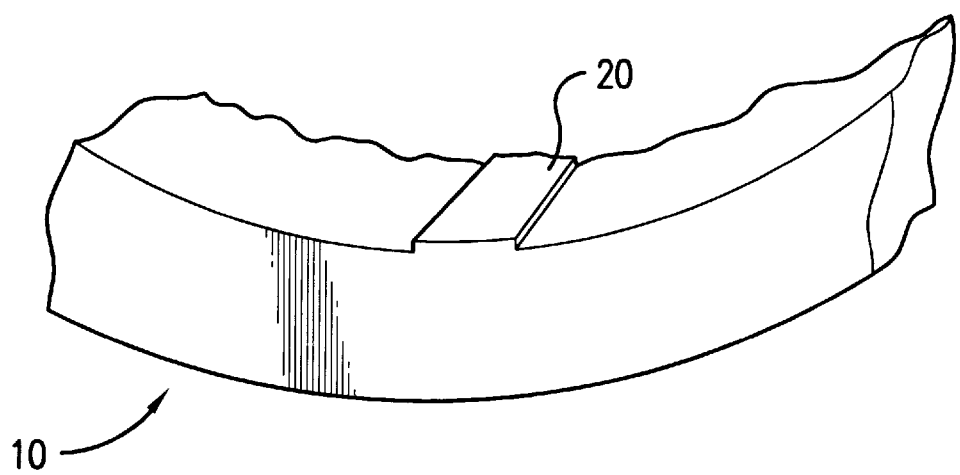
FIG. 2 shows a cross-section of detail A of FIG. 1.

As a replacement for straight seam welded steel pipes used for drive shafts, the invention provides a drive shaft 10 (as shown in FIG. 2) for motor vehicles in the form of a straight seam welded pipe of a strain- (i.e., work) hardening aluminum alloy. The pipe is straight seam welded without additional materials and the wall thickness of the pipe is greater than 2 mm. For example, in the case of an automobile, the wall thickness of the drive shaft can be 2–6 mm but for a truck the wall thickness can be over 6 mm.

The design of the drive shaft as a straight seam welded pipe made from a strain-hardening aluminum alloy is especially advantageous. Such advantages include the weight savings achievable in comparison to steel pipes, the precision achievable with straight seam welded aluminum pipes and the narrow tolerances which can be achieved. In addition, the pipe can be manufactured cost-effectively and economically in contrast to the extruded and drawn aluminum drive shafts.

The step to develop the drive shaft in accordance with the invention as a straight seam welded pipe made of a strain-hardening aluminum alloy should be viewed as a surprising measure since it is known to the skilled artisan that strain-hardening aluminum alloys tend to corrode at elevated temperatures such as around 60° C. and higher. Such elevated temperature values are, however, quite prevalent in drive shafts since they occur during operation due to the heat produced by the motor of the motor vehicle and due to the heat produced by the gears. One disadvantage of the corrosion lies in the fact that the fatigue limit of the material suffers considerably under such corrosion, which is not acceptable for drive shafts. In tests, it could, however, be ascertained that the danger of a lessened fatigue limit for straight seam welded aluminum pipes according to the invention does not occur. Consequently, a preconception among persons skilled in the art regarding an expected insufficient fatigue limit of seam welded aluminum pipes is overcome in a surprising manner through the development of the drive shaft according to the invention.

Prior to the invention, persons skilled in the art had significant concerns concerning the reliability of the seams of straight seam welded 20 (as shown in FIG. 2) aluminum pipes under dynamically loaded conditions since drive shafts are exposed to significant dynamic loads. Thus, the security of the seam weld is an important factor namely in consideration of the mechanical strength required for the highly dynamically loaded parts. Therefore, while straight seam welded aluminum pipes had been used for statically loaded parts, extruded aluminum pipes were used for dynamically loaded parts in order to provide adequate mechanical strength. Surprisingly, the seam welded aluminum drive shaft according to the invention provides adequate mechanical strength under the dynamic loading conditions of motor vehicle operation.

In the invention, it is advantageous with regard to the drive shafts that straight seam welded pipes can be provided with more exact and smaller tolerances with regard to the wall thickness without incorporation of additional materials than extruded pipes. Thus, since the weight fluctuations of the straight seam welded aluminum pipes over their length are lower than in the case of extruded aluminum pipes, the dynamic characteristics of the seam welded aluminum pipes according to the invention are advantageously improved compared to the extruded pipes.

It has proven itself to be especially useful in the invention that the straight seam welded pipes consist of an AlMgMn alloy. Based on this, the drive shafts manufactured in accordance with the invention could optimally meet all of the performance requirements.

Suitable AlMgMn alloys include 5000 series alloys such as 5086 and 5454 having 0.2–1.0 wt. % Mn and 2.0–5.0 wt. % Mg. Alloy 5086 includes $\leq 0.40\%$ Si, $\leq 0.50\%$ Fe, $\leq 0.10\%$ Cu, 0.20–0.70% Mn, 3.5–4.5% Mg, $\leq 0.15\%$ Ti, 0.05–0.25% Cr, bal Al. Alloy 5454 includes $\leq 0.25\%$ Si, $\leq 0.40\%$ Fe, $\leq 0.10\%$ Cu, 0.50–1.0% Mn, 2.4–3.0% Mg, 0.05–0.20% Cr, $\leq 0.20\%$ Ti, bal Al. According to a preferred embodiment of the invention, the aluminum alloy is seam welded without subsequent heat treating or further working of the seam welded pipe. Such processing provides the pipe in a work hardened condition.

A further suitable design of the invention lies in that the variation in wall thickness in the area of the seam weld can be limited to ±0.1 mm. The seam weld can be achieved by conventional high frequency induction welding (HFI welding) whereby no additional materials are required for the welding process. This provides a weld seam of a melted and resolidified portion of the aluminum alloy. Nevertheless, a welding seam develops from this process, which represents a thickening of the wall thickness of the aluminum pipe due to melting and resolidification of the aluminum pipe. This thickening of the welded seam, described as a seam reinforcement, is subsequently removed within the given tolerance range of −0.1 to +0.1 mm, that is to say, in the area of the welded seam a remaining thickening of +0.1 mm is acceptable and on the other hand, it is acceptable if too much material is taken away when the seam reinforcement is removed and a lessening of the wall thickness of the pipe by −0.1 mm results.

The foregoing has described the principles, preferred embodiments and modes of operation of the present invention. However, the invention should not be construed as being limited to the particular embodiments discussed. Thus, the above-described embodiments should be regarded as illustrative rather than restrictive, and it should be appreciated that variations may be made in those embodiments by workers skilled in the art without departing from the scope of the present invention as defined by the following claims.

What is claimed is:

1. A drive shaft for motor vehicles wherein rotation of the drive shaft transmits torque from an engine to at least one wheel of the vehicle, the drive shaft being rotationally coupled for transmitting torque between the engine and the at least one wheel, the drive shaft comprising a straight seam welded pipe of an aluminum alloy, the pipe having a straight weld seam without incorporation of additional materials, the pipe having a wall thickness greater than 2 mm, the weld seam having a variation in wall thickness of between −0.1 and +0.1 mm, the drive shaft having an inner surface which is a continuous surface and the wall thickness being substantially constant from one end to the other end of the pipe.

2. The drive shaft of claim 1, wherein the aluminum alloy comprises an AlMgMn alloy.

3. The drive shaft of claim 1, wherein the wall thickness is at least 2 mm thick.

4. The drive shaft of claim 1, wherein the weld seam consists of a melted and resolidified portion of the aluminum alloy.

5. The drive shaft of claim 1, wherein the aluminum alloy includes 2.0–5.0 wt % Mg and 0.2–1.0% Mn.

6. The drive shaft of claim 1, wherein the pipe is in a work hardened condition.

7. The drive shaft of claim 1, wherein the aluminum alloy comprises a strain-hardening aluminum alloy.

8. The drive shaft of claim 1, wherein the wall thickness is at least 6 mm.

9. The drive shaft of claim 1, wherein the pipe has a substantially constant diameter from one axial end thereof to an opposite axial end thereof.

10. The drive shaft of claim 1, wherein the continuous surface extends from one axial end to an opposite axial end of the pipe.

11. The drive shaft of claim 1, wherein the weld seam has been formed by high frequency welding.

12. The drive shaft of claim 1, wherein the pipe exhibits a fatigue limit sufficient to withstand dynamically loaded conditions under which the drive shaft is subjected during motor vehicle operation.

13. The drive shaft of claim 1, wherein the pipe exhibits dynamic characteristics which are improved compared to an extruded pipe of the same dimensions and of the same aluminum alloy.

* * * * *